United States Patent Office 3,454,759
Patented July 8, 1969

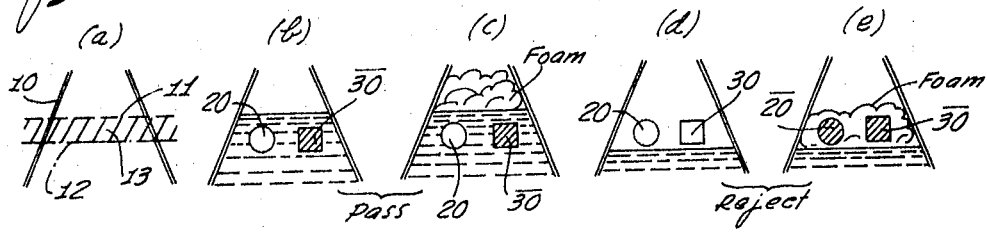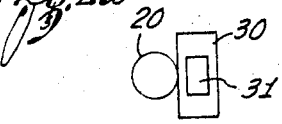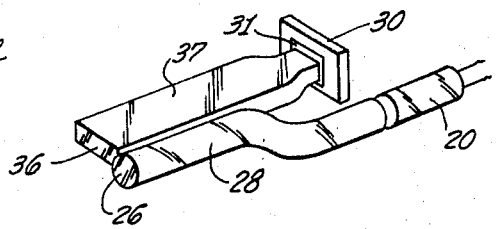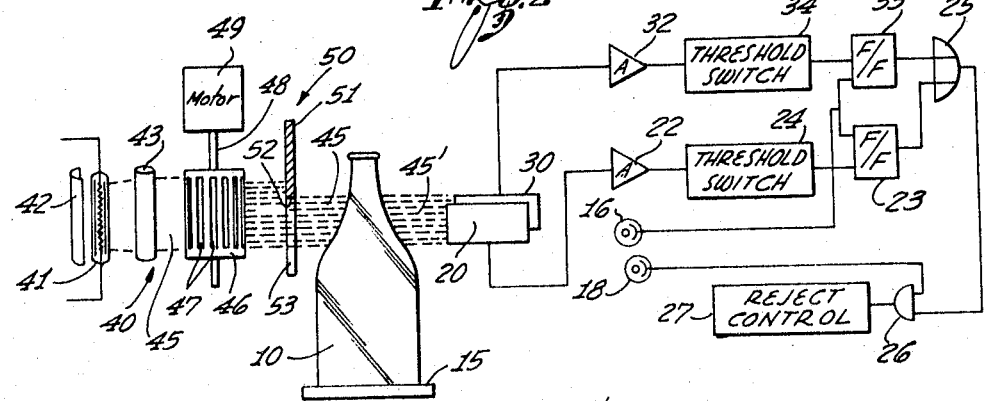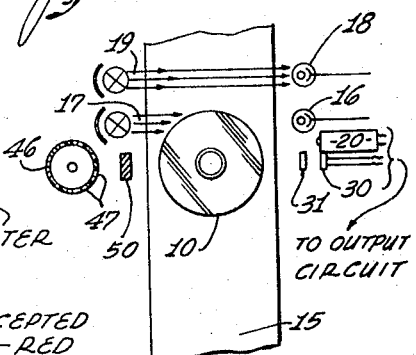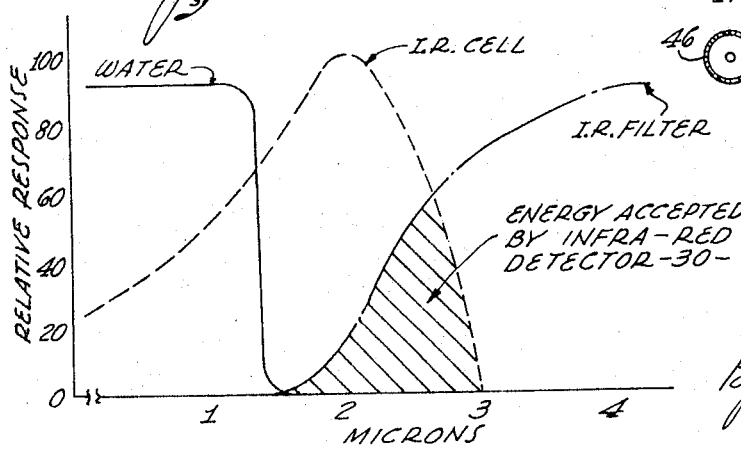

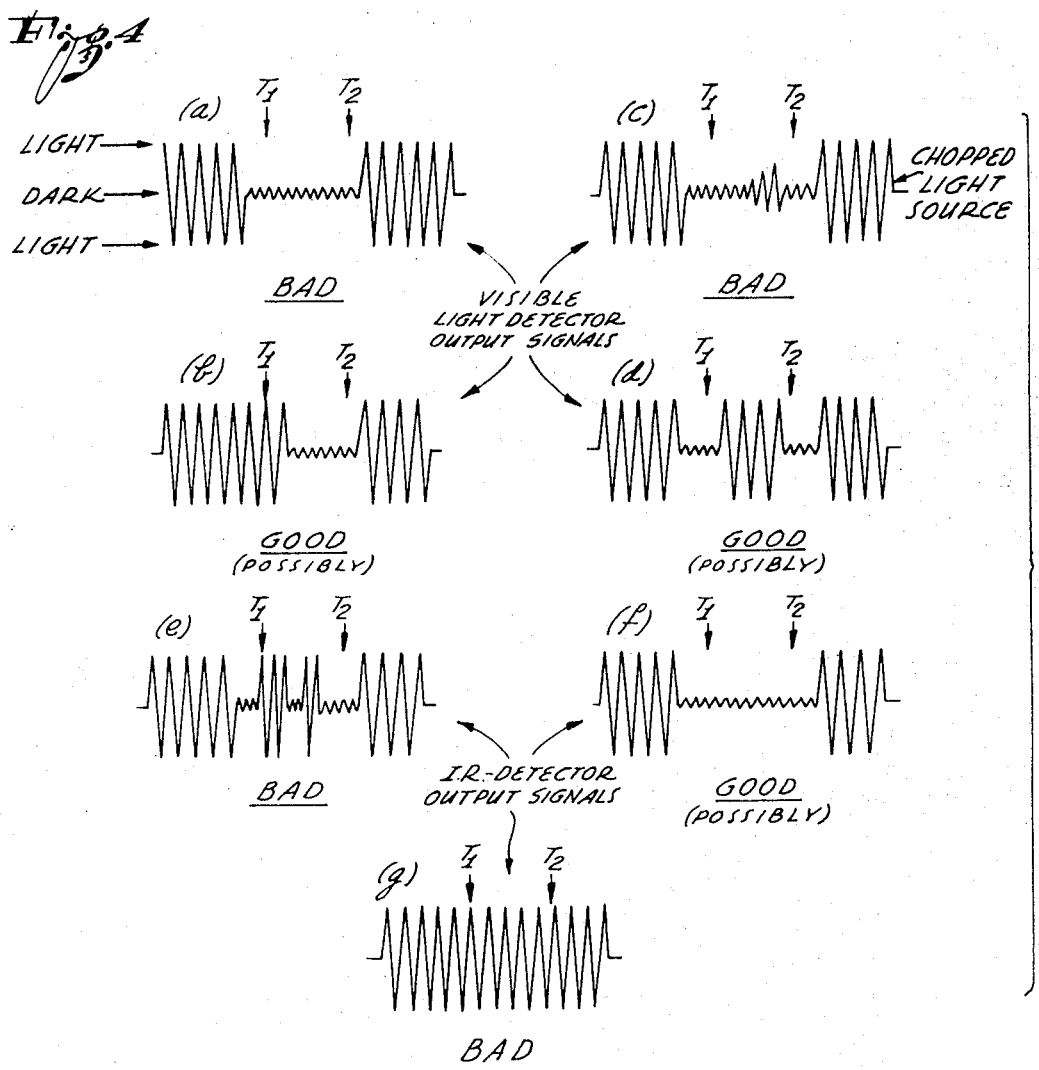

3,454,759
INFRARED LIQUID LEVEL INSPECTION SYSTEM FOR A CONTAINER WHICH MAY CONTAIN FOAM ABOVE THE LIQUID
Fredrick L. Calhoun, Torrance, Calif., assignor to Industrial Dynamics Company, Ltd., Torrance, Calif., a corporation of California
Filed Apr. 22, 1966, Ser. No. 544,445
Int. Cl. G01n 21/24
U.S. Cl. 250—43.5                                          13 Claims

ABSTRACT OF THE DISCLOSURE

This invention relates to a system for detecting the level of a liquid in a container even when foam is present above the liquid. The system includes a source of light with frequencies in the visible and infrared bands. The light is directed toward the container at substantially the level to be measured. The container passes the light in the visible and infrared bands. The liquid in the container passes the light in the visible band but attenuates the light in the infrared bands. The foam in the container attenuates the light in the visible and infrared bands.

Means are provided for filtering the light passing from the container so that only the light in the infrared band is able to pass to an infrared cell. When the infrared cell continuously produces a signal of relatively low amplitude during a test period, an indication is provided that either the liquid or the foam above the liquid is at the desired level.

A second cell receives the visible light passing from the container. When this cell produces a signal of relatively high amplitude, an indication is provided that the foam above the liquid is not at the desired level. In this way, circuitry associated with the infrared and second cells provides an indication as to the level of the liquid in the container even when foam exists above the liquid.

---

This application relates to a system for detecting the level at which a particular material such as a liquid is filled in a container such as a bottle. This application is particularly concerned with a system for indicating the level of a liquid in a container even when the level of the liquid is obscured by foam above the liquid. The invention disclosed and claimed in this application is especially relevant to a system for insuring that containers are filled with a liquid at least to a minimum desired level.

In Patent 3,225,191 issued on Dec. 21, 1965, to me and assigned of record to the assignee of record in this application, a system is disclosed for detecting the level of liquid in a container and particularly for detecting whether the container is filled at least to a minimum desired level. The system disclosed in Patent 3,225,191 includes a source of radiant energy, preferably including energy in the infrared range. The source is disposed to direct energy through the container at a level corresponding to a minimum level of the liquid to be detected in the bottle. An energy-responsive member such as an infrared cell is disposed to receive the infrared energy passing through the container. When the level of the liquid in the container is at or above the minimum level to be detected, the energy passing to the container from the source is absorbed by the liquid so that substantially no energy can reach the infrared cell. However, when the container is filled to a level below the minimum level to be detected, the infrared energy from the source is able to pass through the container to the infrared cell to obtain the production of a signal by the cell. In this way, the response of the infrared cell provides an indication as to whether or not the container has been filled with liquid to at least a minimum desired level.

The system disclosed and claimed in Patent 3,225,191 is advantageous for certain important reasons. One reason is that the light source can provide energy through a range of frequencies including visible light and energies in the infrared range. This means that the light source does not have to be selective in frequency. Since various liquids such as water have characteristics of passing energy in the visible range but absorbing energy in other ranges including the infrared range, such liquids operate in themselves as filters to narrow the range of the energy from the source. The infrared cell is also provided with characteristics of responding essentially only to energy in the infrared band or range. This means that, when liquid is present in the container to at least the minimum desired level, the liquid will block the passage of energy to the infrared cell in the frequency band or range in which the infrared cell is essentially responsive so that no signal will be produced by the cell. If desired, a filter can also be disposed between the energy source and the infrared cell and can be provided with characteristics to block energy in the visible range and pass energy in other ranges including the infrared range so that essentially the only energy producing a response by the infrared cell will be in the infrared range.

The system disclosed and claimed in Patent 3,225,191 sometimes provides ambiguous indications when the level of the liquid in the container is below the minimum value desired but foam is present in the container above the liquid to at least a level corresponding to the minimum value desired for the liquid. This results from the fact that the presence of foam in the container to at least a level corresponding to the minimum value desired for the liquid causes the energy passing from the light source to be blocked from passing to the infrared cell. In this way, the infrared cell provides an indication corresponding to that which is provided by the cell when the level of the liquid in the container is actually at or above the minimum level desired. Under such circumstances, the system disclosed and claimed in Patent 3,225,191 sometimes accepts a container as having been filled to at least the minimum level desired even though the level of the liquid in the container may actually be below such a level.

This invention includes the features disclosed and claimed in Patent 3,225,191 and includes additional features for insuring that the system distinguishes between bottles filled with liquid to at least the minimum level desired and containers filled to a level less than the minimum level desired but having foam present above the liquid to a level at least equal to the minimum level of liquid desired. The system constituting this invention includes a light source and an infrared cell in a manner similar to that disclosed and claimed in Patent 3,225,191. The system also includes a photocell responsive to light in the visible band or range from the light source providing the energy to the infrared cell or from a separate light source. This photocell is disposed at substantially the same level as the cell responsive to energy in the infrared range so as to receive the visible light passing through the container at this level. The photocell responsive to the energy in the visible band or range produces a signal when the level of the liquid in the container is at least equal to a minimum level desired and also produces a signal when the level of the liquid is below the minimum level desired and there is no foam in the container above the liquid. However, the photocell responsive to energy in the visible band or range does not produce a signal when the level of the liquid is below the minimum level desired and foam is present in the container above the liquid to a level at least corresponding to the minimum level desired for the liquid.

In this way, the system constituting this invention passes a container when the cell responsive to energy in the infrared level does not produce a signal and the cell responsive to light in the visible band or range produces a signal. If the cell responsive to energy in the infrared range produces a signal or if the cell responsive to the light in the visible range does not produce a signal or if both of these conditions exist simultaneously for a container being inspected, the container under inspection is rejected as not containing liquid to at least the minimum level desired.

The system is further refined to eliminate further disturbances such as container irregularities or an irregular foam level. The output signals of the two cells are processed in that the two cells are sampled over a particular period. If the infrared cell receives radiation at least once during the particular sampling period, such a signal is used conclusively for signalling absence of liquid in the desired level.

Should, however, during the same period the infrared cell persist in signalling presence of substance, which may be liquid or foam, then the photocell is used to resolve this ambiguity. Specifically, the ambiguity exists only in the sense that there may be liquid in the proper level or a thick layer of foam. For a thick foam layer the photocell persist in signalling presence of substance, which tive of a complete blocking of light by foam. If liquid is in the radiation path at least some light should reach the photocell.

While the specification concludes with claims particularly pointing out and distinctly claiming the subject matter which is regarded as the invention, it is believed that the invention, the objects and features of the invention and further objects, features and advantgaes thereof will be better understood from the following deseription taken in connection with the accompanying drawing in which:

FIGURE 1 illustrates schematically the operating conditions of a detector system in accordance with the present invention;

FIGURE 2 illustrates somewhat schematically a detector station for monitoring the filling state in bottles;

FIGURE 2a illustrates the front view of a detector arrangement in the station of FIGURE 2;

FIGURE 2b illustrates in perspective view the two detectors of the inspection station with means for enlarging the looking angle for each of them;

FIGURE 3 illustrates a top view of the station shown in FIGURE 2;

FIGURE 4 illustrates several output signals of the detectors in representation of the several operating conditions; and FIGURE 5 illustrates plots of several characteristics pertinent for the preferred system as described.

The objective of the invention will be understood best when referring to FIGURE 1a. Reference numeral 10 designates the neck of a transparent or semi-transparent container such as a bottle. The bottle will be filled with liquid and for a properly filled bottle the level should reach the neck. Representatively, level 12 denotes a filling state, which when not reached is regarded as indicative of an improperly filled bottle. Assuming a horizontally oriented inspection beam is directde towards the bottle and assuming further that a detector is suitably positioned above level 12, then the detector will detect light modulated by the liquid above level 12 when the bottle is properly filled. Should the bottle be filled to level 12 or below only, or even be empty, then the light reaching the detector would not be modulated by liquid to indicate an improperly filled bottle. There is a tolerance zone 13 above level 12 resulting from the finite width of a detector in vertical direction. A liquid level reaching zone 13 may be detected as being proper or improper while a level above a level 11 when detected definitely defines a proper fill state.

A deviation from the fill state representation occurs if the bottle is filled to level 12 only or even below, but a layer of foam is on top of the liquid's surface. This may often be the case when the liquid is carbonated. The foam may reach level 11 or extend even higher, and will thus modulate the light reaching the detector; a correct filling state would be simulated even though the bottle should be rejected as being improperly filled. Thus, it is necessary to distinguish the presence of foam above level 12.

The principle behind the invention will be understood best with reference to FIGURES 1b to 1e, schematically denoting different situations. 20 and 30 respectively denote two different detectors. Both detectors are positioned to monitor radiation which passes through the neck of the bottle 10 in horizontal direction, and both detectors are positioned in relation to the bottle and to a source of radiation, so that the liquid modulates the radiation reaching the two detectors when the bottle is properly filled.

The detectors are designed so that detector 20 still receives radiation even if such radiation has passed through liquid but the same liquid prevents detector 30 from receiving any radiation. This operational state is representatively denoted in Boolean terms as $20 \cdot \overline{30}$ and is illustrated in FIGURE 1b; it represents a properly filled bottle. This situation is not changed if on top of the liquid of a properly filled bottle there is foam (FIGURE 1c) as this foam is not in the path of the radiation of the inspection beam. Should the bottle be improperly filled, but without foam, both detectors will receive radiation. Detector 20, of course, will receive more than before, but for purposes of the invention the operational state of detector 20 is regarded as being similar for the two cases: detector 20 will receive radiation whether or not the radiation is modulated by liquid. This improper filling state now is symbolized as condition $20 \cdot 30$, and represents a reject situation.

A bottle similarly filled improperly, but with foam, will now block the radiation from reaching any of the two detectors because foam has a very strong scattering effect on any type of radiation. This second improper filling state is represented by the condition $\overline{20} \cdot \overline{30}$. The following description is now devoted to an inspection system having detectors of these types and realizing the above-defined operational states to provide for reject control signals in case an improperly filled bottle has been detected.

Proceeding now to FIGURES 2 and 3, there is shown a bottle with a neck 10 on a conveyor 15. Bottles are continuously transported past an inspection station having, on one side of the conveyor belt, an illuminating portion 40. This illuminating station includes an incandescent lamp 41, i.e., a source of radiation emitting visible light as well as infrared light. A mirror 42 as well as a cylinder lens 43 produce a collimated light beam 45 of rather narrow dimensions in the horizontal and extending predominantly vertically, over a few millimeters.

This light beam passes through a light chopper comprised of a hollow cylinder 46, the peripheral wall of which has elongated slots 47. The cylinder 46 is mounted on a vertical shaft 48 which in turn is rotated continuously by a motor 49. Whenever a pair of diametrically oppositely located slots 47 register with the beam 45, the beam will pass through the cylinder. Whenever a bar in between two slots 47 is in front of the light beam the beam is blocked. Thus, the chopper modulates the light beam at a frequency which is determined by the numbers of revolution per second of the cylinder as driven by the motor 49 times half the number of slots 47 (or the total number of pairs of slots). The speed of the motor 49 should be rather constant, because this frequency of the light intensity modulation should extend only over a narrow frequency band.

The chopped light beam then reaches a mask 50 having an upper, opaque portion 51 separated by a horizontal boundary 52 from a lower, transparent portion 53. This mask 50 is positioned so that the boundary has approximately the same relative vertical position as the proper level 11 of the liquid in a bottle to be inspected. This way substantially all light which otherwise would travel substantially unattenuated above the proper liquid level is blocked off.

The light now passes through the bottleneck 10 for attenuation in accordance with the content thereof. There always will be some attenuation by the glass or other material of the container and there will be attenuation by liquid if present in the neck 10. A thus modulated beam 45' leaves the location of attenuation and reaches the juxtaposed detectors 20 and 30 arranged just above the liquid level 12 representing the definitely improper filling state. The detector 20 may, for example, be a silicon diode which is responsive to visible light. The fact that the diode is also responsive to infrared light is not important here. From a more general point of view detector 20 should be responsive to a radiation to which detector 30 is not responsive. Whether or not detector 20 is also responsive to the radiation to which detector 30 responds is not important.

The detector 30 is, for example, a lead sulfide cell which is known to be suitable for infrared detection. Thus, detector 30 is an infrared detector. An infrared filter 31 is placed in front of the cells 30 because a lead sulfide cell has still some sensitivity in the visible range. Representative response curves are shown in FIGURE 5. The dashed line is the relative response plotted over wave lengths of the frequency band of interest. The superimposed dash-dot curve shows the relative passage range of the filter 31. The hatched area denotes radiation energy which is passed by the filter and is accepted by the infrared detector 30.

The inspection station further has two trigger and gate control photocells 16 and 18 having no particularly critical response curves. The two photocells are positioned to determine the relative position of a bottle in relation to the beam 45' and the range of detectors 20 and 30. In particular, the cell 16 is positioned in relation to a control beam 17, so that the bottle interrupts the control beam when the inspection beam 45 enters the neck of the bottle, and this bottle is then regarded as entering the inspection station; this occurs at times $T_1$. The cell 18 is positioned in relation to the same or a second beam 19, so that the bottle will interrupt the beam when leaving the inspection station at time $T_2$. The period between $T_1$ and $T_2$ is the inspection period for a bottle. Leaving the inspection station means that the inspection beam 45 is about to pass only through glass of a bottle at the relative rear end of the bottle neck as taken in relation to the direction of movement of conveyor 15.

It will be recalled that beam 45 is modulated by a rotating slotted cylinder 46. Thus, the light reaching the detectors 20 and 30 is also modulated, and this can be regarded as a carrier frequency type signal. The bottle neck and its content amplitude modulates this carrier. Each of the detectors feeds its output, which is an amplitude modulated oscillatory signal, to an amplifier tuned to the carrier frequency. There are two such amplifiers 22 and 32 respectively for the two detectors.

It is preferred to use an A.C. type light and detector signal and to use tuned circuits on the detector output sides for purposes of suppression of ambient light, particularly of ambient light that may vary in time and thus cannot adequately be compensated with a fixed bias. Thus the frequency of the light chopping should be selected in that it differs definitely from any ambient light variations.

The tuned amplifiers 22 and 32 respectively operate threshold detectors 24 and 34 having step transfer characteristics with saturation. Conceivably, the amplifiers 22 and 32 themselves may be provided with threshold characteristics, rejecting input signals below one level and going quickly into saturation for input signals above that level; of course, the signal levels of response are individual for each detector output circuit. Thus, as long as the illumination signals from beam 45' have amplitudes below the respective threshold, zero output will be produced by the respective tuned circuit, 22–24 or 22–34. For amplitudes above a second level, not too much above the threshold, constant output peaks are produced. The tuned amplifiers or threshold detectors may have rectifiers in their respective output circuits, but this is not essential.

Tuned amplifier 22 with threshold detector 24 now controls the reset side input of a flip-flop 23, and tuned amplifier 32 with detector 34 control the set side input of a flip-flop 33. Thus, if the illumination received by the photodiode 20 exceeds the threshold, flip-flop 23 will be reset (if it was set) and if the illumination received by the infrared cell 30 exceeds the threshold, flip-flop 33 will be set (if it was reset). The trigger cell 16 sets flip-flop 23 and resets flip-flop 33, when a bottle enters the inspection station. However, the cell 16 does not maintain those states of the flip-flops throughout the inspection period, but merely establishes these two states at the beginning thereof.

Before turning to an explanation of the reasons for these provisions and how the flip-flops are being used to control rejection of an improperly filled bottle, the flip-flop output circuits shall be described also.

An OR gate 25 receives a true signal either when flip-flop 33 is set, or when flip-flop 23 is set. The output of OR gate 25 is the signal input for a control gate 26 receiving as gating signal the output signal from photocell 18 which is a short pulse occurring when the bottle is about to leave the inspection station at time $T_2$. The output of gate 26 controls a reject mechanism 27 operating in a manner that it prevents an improperly filled bottle from passing further along with the properly filled ones. Thus, the two gates 25 and 26 together with the control signal from photocell 18 monitor the state of the flip-flops at the end of an inspection period.

We now turn to FIGURE 4. In each of the figures $T_1$ marks the instant when cell 16 produces its trigger output, to thereby control the beginning of an inspection period. The time $T_2$ marks the instant when cell 18 produces its output to terminate the inspection period. We also have to refer again to FIGURE 1, to recapitulate the three different operation conditions—FIGURES 1b and 1c can be regarded as similar. However, we must also particularize more fully what the operating conditions are.

Here it is to be observed, that for a properly filled bottle, the liquid underneath the surface level offers a uniform, i.e., homogenious medium to the inspection beam. Hence, the beam will be attenuated uniformly. The visible light will be attenuated somewhat, depending upon the color of the liquid; however, for purposes of the invention, it is assumed, that the light reaching the cell 20 after passing through the liquid of a properly filled bottle still is sufficient, so that threshold device 24 can respond to produce an output representative of the state "light."

The infrared detector 30, however, will not receive sufficient light, as can be concluded from FIGURE 5, if the liquid is predominantly water. Practically all of the radiation to which the detector 30 can respond in the absence of liquid, is absorbed by the liquid and the filter 31. Fully drawn curve in FIGURE 5 shows the passage of radiation through water and thus represents the frequency distribution of the input energy for detector 30. There is no energy left to fall into the "hatched" area, and detector 30 does not receive any radiation, or at least so little that threshold device 34 will not respond. Hence, the system establishes indeed the condition 20 "light," 30 "dark" for the regular filling state. More particularly, the signal output of threshold device 24 will have reset flip-flop 23 right at the beginning of the inspection period (FIGURE 4d), and throughout the inspection period threshold device 34 did not set flip-flop 33 (FIGURE 4f). Thus, at the end of the inspection period no true signals are applied through gate 25 to gate 26 so that the output pulse from cell 18, establishing the end of the inspection period cannot trigger the reject mechanism 27 the bottle has passed the inspection.

The normal reject situation exists (FIGURE 1d) when the inspection beam passes over the liquid level and both detectors are "light." More particularly, detector 30 will receive more light than in the proper fill state case, but this does not change the output of threshold device 24. On the other hand, the channel 30–32–34 is adjusted to produce a "light" output when no liquid is above level 12. Thus flip-flop 33 will be set during the inspection period, and a "true" signal is applied through gate 25 to gate 26 so that at the end of the inspection period reject mechanism 27 will be triggered.

The second reject situation is depicted in FIGURE 1e. Foam on top of an improperly filled bottle scatters all radiation and absorbs some, provided, of course, the foam extends clear into and through the inspection range as observed. For this case both detectors do not receive radiation to cause production of an output. Here, however, it must be observed that foam is an irregular medium and may have an irregular top surface. Thus, an underfilled bottle may have a foam layer only partially reaching into the inspection zone. Moreover, bottles are usually cheap commodities and thus do not have smooth surfaces: flutes and ridges in the bottle may redirect the radiation or provide temporary focusing or temporary dipersion. For this reason, it would be insufficient to monitor the state of the liquid for an instant only, but the inspection period is set up to permit elimination of all those temporary disturbances which may at times modulate the light intensity in deviation of the normal modulation by the liquid, by homogenous foam or by empty space.

Thus, during the inspection period the situation may arise, temporarily, that one of the detectors goes "dark" and the other goes "light" for a short period, particularly because at any instant the two detectors monitor different areas in the bottle due to their side by side position. These temporary conditions due to bottle irregularities and/or irregular foam-on-top of the liquid of an underfilled bottle may produce temporarily a 20-light, 30-dark condition which is normally indicative of a proper filling state and must be distinguished from the true proper fiilling condition wherein throughout the inspection period the condition is: 20-light, 30-dark.

This distinction is accomplished as follows:

The infrared detector is regarded as the principle control element, as it could be the exclusive one if the foam problem did not exist. Thus, for a bottle to be properly filled, the detector 30 must be "dark" throughout the inspection period. Should the detector 30 go "light" during the inspection period, briefly or throughout, then a reject condition exists.

One can see the reason for this requirement: irregular foam on top of an improperly filled bottle, or flutes or ridges of the bottle may cause a temporary deflection of the infrared radiation so that the detector 30 may temporarily go "dark." However, the detector 30 can possibly go "light" only if liquid is not in the path of the radiation, and this condition is not altered by temporary deflections of the inspection beam.

This now explains the mode of control of flip-flop 33. The gating signal as provided at time $T_1$ resets the flip-flop. The flip-flop 33 undoubtedly is in the set state prior to the time $T_1$ as infrared radiation will have reached the detector 30 when no bottle is in the inspection station. If during the inspection period no infrared radiation is received, flip-flop 33 stays reset. During the inspection period detector 30 can go "light" only when the liquid level is too low, and this will happen when there is no foam or when the foam permits at least temporarily a beam pulse to reach the detector 30. Then flip-flop 33 will be set and a "true" signal is applied through OR gate 25 and from there to AND gate 26. At end of the inspection period ($T_2$) OR gate 25 still applies a true signal to AND gate 26 so that the pulse from cell 18 will trigger the reject mechanism 27. This operation is independently from the visible light detector 20, because we found it reasonable to postulate the condition: The bottle cannot possibly be properly filled when during the inspection period at least some infrared radiation can reach the infrared detector; there may be some foam, but the mere fact that detector 30 was energized unambiguously established the absence situation so that detector 20 is not needed in this case.

If during the inspection period no infrared reaches the detector 30, flip-flop 33 stays reset, but this does not conclusively establish that the bottle is properly filled, because thick foam may have blocked all of the infrared radiation. The sole function of the visible light detector 20 is now to prevent that a thick foam layer which blocks the input path to the infrared detector throughout the inspection period does not simulate a properly filled bottle condition. Thus, when detector 30 stays dark and flip-flop 33 stays reset throughout the inspection period, this may be due to thick foam and it must be detected whether detector 20 stays also dark throughout the inspection period, because this is the correlate to the situation detector 30 cannot detect conclusively.

Flip-flop 23 is set at the beginning of an inspection period by the trigger signal from cell 16. The flip-flop 23 will be reset if light can reach detector 20 at least at some instant during the inspection period; this can occur only when a thick foam layer does not obscure the detector range. However, flip-flop 23 will not be reset if the detector 20 remains dark throughout the inspection period, and this will be the case only when there is an underfilled bottle with a thick foam layer. If flip-flop 23 remains set, a "true" input is applied through OR gate 25 to the reject control gate 26, and again at the end of the inspection period, cell 18 will produce a trigger signal which will become operative as reject control signal.

It should be noted that this last described principle of using visible light detector 20 for foam detection takes care also of the situation that a properly filled bottle may have bubbles to a considerable extent due to the transport, which rise to the top, thus scattering light. This means that a temporary state of the detector 20 should not register as a reject situation, so that a temporary dark state of cell 20 still may indicate a properly filled bottle. On the other hand, raising bubbles in the liquid will not make the infrared detector go "light," not even temporarily.

Since each detector controls during the inspection period the state of a flip-flop at the end of the inspection period independently from the respective other detector, it is possible to give each detector its "own" inspection period. This may be advisable for those cases when the bottleneck is rather thin. It should be observed that the two detectors are aligned in direction of bottle transport so that the maximum inspection period common to both detectors is: inner width of the bottleneck minus distance between the detectors over speed of the bottles when passing through the inspection station.

It should be noted specifically that each detector responds to a different type of radiation, because the different types of radiation are influenced differently by liquid, no-liquid, or foam. In the present case the different types of radiation are visible light and infrared radiation. The fact that the same radiation source is used is merely a matter of convenience and points to the fact that implementation of the principles involved permits simplification by employing suitable means. The basic principle of the invention may require separate inspection beams, per type of radiation. However, many sources of radiation emit different types of radiation, as for example, an incandescent lamp emits both, infrared and visible light, so that a single source can be used to greatly facilitate the practicing of the invention.

The system as described thus far operates satisfactorily under most circumstances. However, unfavorable operating conditions not yet particularized may occur at times introducing conditions which can influence the system rather severely.

For example, in the embodiment as described, it was assumed that flutes and ridges in the bottle are not able to provide a very strong focusing so that infrared radiation, even though substantially absorbed by the water in the bottle and by the filter 31, do not absorb sufficient radiation to place detector 30 into the dark state, as is necessary for a properly filled bottle to pass the inspection. Thus in spite of the strong absorption by the liquid of a properly filled bottle and by the filter, the detector 30 may become energized sufficient to cause threshold device 34 to respond and to produce a signal comparable with that of a properly filled bottle.

This problem can be overcome by using two infrared filters in front of the detector 30. Thus, by ensuring cut off of any infrared radiation that can possibly traverse the liquid filled bottle it can be ensured that a properly filled bottle cannot be rejected.

The defocusing effect produced by flutes and ridges was dealt with above in that they were regarded as temporary phenomena. Thus, the visible light detector 20 can go "dark" temporarily, and the bottle may still be regarded as properly filled, because a dark state throughout the inspection period is required for the visible light detector to produce an effective reject control response.

However, a properly filled bottle, producing a dark condition in infrared detector 30, may produce a reject condition in that a flute maintains the visible light detector 20 in the dark state also. Also, an improperly filled bottle may have a flute accidentally oriented to block off all the light for the infrared detector 30, while some light may reach the visible light detector 20. These situations can be dealt with, by providing a rather wide inspection angle for either detector; this is shown in FIGURE 2b.

A fiber optic 37 of rather flat configuration in the direction of travel of the bottles is placed in front of IR detector 30. It will be recalled that a properly filled bottle requires "no light" for the IR detector 30 throughout the inspection period. The rather wide inspection angle set up by the front window 36 of the fiber optic makes it extremely unlikely that a moving, improperly filled bottle consistently deflects all infrared radiation from the detector throughout the inspection period thus simulating a properly filled bottle. The response of detector 20 is needed only for the "foam" situation and when detector 30 remains dark throughout the inspection period. A fiber optic 28 with front window 26 prevents a flute of a properly filled bottle from consistently blocking all the light from the detector 20, inasmuch as a widened looking angle ensures that for a properly filled bottle at least some light will reach the detector 20 at least at some instants during the inspection period.

It should be noted that the principle expounded above can be used also for the detetiton of overfill, wherein now a second detector set of the type outlined above is disposed at a higher level, i.e., above the level regarded as correct. For this case, the FIGURES 1d and 1e can be regarded as representing the situation for a correct filling state, with FIGURE 1d showing the normal case and FIGURE 1e representing a correct filling state whereby foam simulates an overfill state. FIGURES 1b and 1c then are normal overfill situations. The circuit logic could then be complementary to the one shown in FIGURE 2, and for example, if one interposes an inverter in the line between the output of OR gate and the reject control, rejection for an overfill would be controlled properly.

The invention is not limited to the embodiments described above but all changes and modifications thereof not constituting departures from the spirit and scope of the invention are intended to be covered by the following claims.

What is claimed is:

1. In combination for indicating a particular level of liquid in a container having characteristics of passing energy in the visible and infrared bands of wavelengths where the liquid has properties of passing energy in the visible bands and of blocking the passage of energy at wavelengths in the infrared band and at wavelengths above the infrared band, and where foam above the liquid has properties of blocking the passage of energy in the visible and infrared bands, first means disposed relative to the container for directing energy in the visible and infrared bands toward the container, second means disposed relative to the container for receiving the energy passing from the container at substantially the particular level and having characteristics for blocking energy in a range of wavelengths below the infrared band and for producing signals in accordance with the reception of energy in the infrared band, third means disposed relative to the container for receiving the energy passing from the container at substantially the particular level and having characteristics for producing signals in accordance with the reception of energy in the visible band, and fourth means responsive to the signals produced by the second and third means for indicating whether the level of liquid is at the particular level in accordance with the characteristics of signals from the second and third means.

2. In combination for indicating a particular level of liquid in a container having characteristics of passing energy in the visible and infrared bands of wavelengths where the liquid has properties of passing energy in the visible bands and of blocking the passage of energy at wavelengths in the infrared band and at wavelengths above the infrared band and where foam above the liquid has properties of blocking the passage of energy in the visible and infrared bands, first means disposed relative to the container for directing energy in the visible and infrared bands toward the container, second means disposed relative to the first means for converting the energy from the first means to alternating characteristics, third means disposed relative to the container for receiving energy passing from the container at substantially the particular level and having characteristics for passing energy substantially only in the infrared band to produce a first electrical signal in accordance with the passage of energy in the infrared band from the container, fourth means disposed relative to the container for receiving energy passing from the container at substantially the particular level and having characteristics for producing a second electrical signal in accordance with the passage of energy in the visible band from the container, and fifth means responsive to the production of the second signal and to the lack of production of the first signal for indicating that the liquid has been filled in the container to the particular level.

3. In combination for indicating the absence or presence of liquid at a particular level in a container which may contain foam above the liquid, comprising:

means disposed relative to the container for directing radiant energy toward the container for passing through the container, and including a first portion of radiant energy materially attenuated when passing through the liquid in the container and materially attenuated when passing through the foam in the container, the first portion of radiant energy being less attenuated when passing through the container and when passing above the liquid in the container, the radiant energy including a second portion materially attenuated when passing through the foam in the container and being less attenuated when passing through the liquid in the container and when passing above the liquid in the container;

a first radiation detector responsive to the first portion of radiant energy passing through the container at substantially the particular level, the first detector providing signals having characteristics representative of the attenuation of the first portion of radiant energy when passing through the container below the particular level;

a second radiation detector responsive to the second portion of radiant energy passing through the container at substantially the particular level, the second detector providing signals having characteristics representative of the attenuation of the second portion of radiant energy when passing through the container below the particular level; and means responsive to the signals provided by the first and second detectors to provide an indication whether or not the liquid in the container reaches the particular level independently from the absence and presence of foam above the level of liquid.

4. The combination as set forth in claim 3, wherein said means for directing radiation includes means for providing the radiation with alternating characteristics to provide the signals from the first and second detectors with alternating characteristics and wherein the signal responsive means is responsive to the alternating characteristics of the signals from the first and second detectors.

5. The combination set forth in claim 3, comprising: in addition, means for enlarging the observation angle of at least one of said detectors, to provide for optical integration of radiation scattered when passing through the container.

6. In a system for indicating the absence or presence of liquid at a particular level in the container which may contain foam above the liquid, the combination comprising:

means for providing infrared and visible radiation to the container for passage of the visible radiation through the container and through the liquid in the container and for attenuation of the visible radiation by the foam in the container and for passage of the infrared radiation through the container and attenuation of the infrared radiation by the liquid and foam in the container, an infrared detector responsive to the infrared radiation passing through the container at substantially the particular level in the container and providing a particular output if the radiation received is at least temporarily relatively high during a particular period of time as indication that the liquid and foam are below said particular level in said container;

a visible-radiation detector responsive to the visible radiation passing through the container at substantially the particular level in the container and providing a particular output if the radiation received is relatively low continuously for the particular period of time, the particular output not being produced should the radiation received by the visible radiation detector exceed, at least temporarily, a particular level; and means responsive to at least one of the particular output of said infrared detector and the particular output of said visible radiation detector to provide a representation that the liquid is below the particular level without any interference from foam in the container.

7. In combination for indicating a particular liquid level in a container having characteristics of passing infrared radiation and at least some radiation of shorter wavelength than the infrared radiation, the liquid substantially blocking the passage of infrared radiation but passing at least some radiation of the shorter wavelength and foam above the liquid substantially blocking the passage of the infrared radiation and the radiation of the shorter wavelength;

means disposed relative to the container for directing infrared radiation and the radiation of the shorter wavelength towards the container;

means disposed relative to the container for receiving the radiation when passing from the container at substantially the particular liquid level and having characteristics sensitive to substantially the infrared radiation to produce first signals having characteristics in accordance with the reception of the infrared radiation;

means disposed relative to the container for receiving the radiation passing from the container at substantially the particular liquid level to produce second signals having characteristics in accordance with the reception of the radiation of the shorter wavelength; and means responsive to the characteristics of first and second signals for indicating whether the liquid is at the particular level in the container.

8. In a detection system for indicating the absence or presence of a first substance at a particular location in accordance with the characteristics of the first substance and a second substance related to the first substance, the combination comprising:

a first detector for monitoring first radiation transmission characteristics at the particular location to provide a first output when a particular degree of attenuation persists during a particular period through the first and second substances and to provide a second output when the particular degree of attenuation does not persist during the particular period;

a second detector for monitoring second radiation transmission characteristics at the particular location to provide a first output when a particular degree of transmission persists during the particular period and to provide a second output when the particular degree of transmission does not persist during the particular period; and means responsive to the first output of the first detector and the first output of the second detector to indicate the presence of the first substance at the particular location upon the occurrence of such outputs during the particular period and to indicate the absence of the first substance at the particular location upon the occurrence of the second output from the first detector or the second output from the second detector during the particular period.

9. In combination for the detection of presence or absence of a particular substance at a particular location;

means for directing first and second types radiation towards the particular location, the first type radiation interacting with the particular substance so that the first type radiation from the location is particularly attenuated by the particular substance or by a substance other than the particular substance so that the absence of the particular attenuation of the first type radiation conclusively represents the absence of the particular substance and of the other substance at the particular location, the second type radiation interacting with the other substance in a manner that the resulting attenuation of the second type radiation from the location is conclusive as to presence of the other substance, the second type radiation not being attenuated by the particular substance;

a first detector and a second detector disposed at the particular location and responsive respectively to the first and second types radiation at the particular location to respectively provide first and second signals representative of the respective attenuation of the radiation directed by the first means towards the particular location; and means connected to the first and second detectors and responsive to the first signal provided by the first detector in representation of the particular attenuation representing presence of the particular substance or of the other substance at the particular location and being further responsive to the signal provided by the second detector in representation of the attenuation representing presence of the other substance at the particular location to thereby conclusively establish absence or presence of the particular substance at the particular location.

10. In combination for indicating a particular level of liquid in a container having characteristics of passing radiant energy, the liquid having properties of substantially blocking the passage of a first type of radiant energy while passing a second type of radiant energy and foam above the liquid having properties of substantially blocking the first and second types of radiation;
- first means disposed relative to the container for directing the radiant energies of the first and second type towards the containers;
- second means disposed at substantially the particular level to receive the radiant energy of the first type from the container to produce a first signal having first characteristics in representation of the presence of the liquid or foam at substantially the particular level and having second characteristics in representation of the absence of the liquid and foam at substantially the particular level;
- third means disposed at substantially the particular level to receive the radiant energy of the second type from the container to produce a second signal having first characteristics in representation of foam at substantially the particular level and having second characteristics in representation of absence of the foam at substantially the particular level; and
- fourth means connected to the second and third means and responsive to the first and second signals to provide an output indicative of the absence of liquid at substantially the particular level when the first signal has the second characteristics or when the second signal has the first characteristics and to provide an output indicative of the presence of the liquid at substantially the particular level at all other times.

11. A detector system for detecting first and second particular substances at a particular location, comprising:
- first means for directing radiation towards the particular location for interaction with substances at the particular location to leave the particular location with characteristics dependent upon the characteristics of the particular substances, radiation leaving the particular location having characteristics representing the interaction of the radiation with the substances;
- second means for monitoring the radiation from the particular location to produce output signals having first characteristics representative of the interaction of the radiation from the first means with the first and second particular ones of the substances at the particular location and having second characteristics representative of no interaction of the radiation from the first means with the first and second particular ones of the substances at the particular location;
- third means for monitoring the radiation from the particular location to produce output signals having first characteristics representative of the interaction of the radiation from the first means with the second particular one of the substances at the particular location and having second characteristics representative of no interaction of the radiation from the first means with the second particular one of the substances at the particular location;
- first circuit means connected to the second means to provide a first operative output if the output signal has at least temporarily the second characteristics during a particular period of time and to provide a second output if said output signal has the first characteristics consistently during said particular period;
- second circuit means connected to the third means to provide a first operative output if the output signal has the second characteristics during the particular period of time and to provide the second operative output if the output signal has the first characteristics during the particular period; and
- third circuit means connected to the first and second circuit means to provide a first operative output when the first or second circuit means provides the first output and to provide a second operative output at all other times.

12. In combination for indicating a particular level of liquid in a container which may contain foam above the liquid, the container having characteristics of passing energy in the visible and infrared band, the liquid having properties of substantially blocking the passage of energy in the infrared band while permitting passage of at least some visible light and foam above the liquid having properties of substantially blocking the passage of energy in the infrared and visible bands;
- means for directing radiation having alternating characteristics and including visible and infrared radiation toward the container, the radiation including a directionally significant component passing through the container and through liquid in the container when the liquid is substantially at said particular level while passing above the liquid in the container if the level of the liquid is below the particular level;
- first detector means responsive to the directionally significant component of the infrared radiation coming from the container to produce a particular output having the alternating characteristics and indicative of passage of the radiation above the liquid and the foam and to produce an output different from the particular output when the radiation passes through the liquid or the foam at the particular level;
- second detector means responsive to the directionally significant component of the visible radiation coming from the container to produce a particular output having the alternating characteristics and indicative of the passage of the visible radiation through the foam and to produce an output different from the particular output when the said visible radiation passes through the liquid or above the liquid and the foam; and
- control means alternatively responsive to said particular outputs of said first and second detector means to provide an operative reject control signal for obtaining a rejection of the container.

13. In combination for indicating whether liquid in a container is at a particular level;
- means disposed relative to the container for directing radiant energy toward the container, the radiant energy including two portions, a first portion being materially attenuated by the liquid, the first portion and a second portion being attenuated materially by foam above the liquid;
- first and second detector means respectively disposed relative to the container to receive the first and second portions of said radiant energy, the portions so received having passed through liquid when the liquid is at the particular level, the portions so received not having passed through liquid when liquid is not at the particular level;
- the first detector means having characteristics for producing signals in accordance with the attenuation of the first portion of said radiation by any liquid and foam in the path of the first portion of said radiation;
- the second detector means having characteristics for producing signals in accordance with the attenuation of the second portion of said radiation by foam; and means responsive to the output signals of said first detector means to provide a representation of absence of the liquid in the particular level when the output signal provided by the first detector means has at least temporarily during a particular period characteristics indicative of absence of liquid or foam in the particular level, such means being further responsive to the output signals of the second detector means to provide said representation, in the alternative, when the output signal of the second detector means has characteristics indicative of attenuation of the second portion of said radiation by foam throughout substantially said particular period.

References Cited

UNITED STATES PATENTS

| 2,974,227 | 3/1961 | Fisher et al. | 250—43.5 |
| 3,094,214 | 6/1963 | Wyman et al. | |
| 3,232,429 | 2/1966 | Norwich | 209—111.7 |

RALPH G. NILSON, *Primary Examiner.*

A. L. BIRCH, *Assistant, Examiner.*

U.S. Cl. X.R.

209—111.7; 250—218, 223, 51, 156, 201